US012620402B2

(12) United States Patent
Udesen

(10) Patent No.: US 12,620,402 B2
(45) Date of Patent: *May 5, 2026

(54) HEARING DEVICE WITH ACCELERATION-BASED BEAMFORMING

(71) Applicant: GN Hearing A/S, Ballerup (DK)

(72) Inventor: Jesper Udesen, Malov (DK)

(73) Assignee: GN Hearing A/S, Ballerup (DK)

( * ) Notice: Subject to any disclaimer, the term of this patent is extended or adjusted under 35 U.S.C. 154(b) by 0 days.

This patent is subject to a terminal disclaimer.

(21) Appl. No.: 18/106,714

(22) Filed: Feb. 7, 2023

(65) Prior Publication Data

US 2023/0197095 A1 Jun. 22, 2023

Related U.S. Application Data

(63) Continuation of application No. 16/667,883, filed on Oct. 29, 2019, now Pat. No. 11,600,286.

(30) Foreign Application Priority Data

Dec. 20, 2018 (EP) .................................... 18214347

(51) Int. Cl.

*G10L 21/0216* (2013.01)
*H04R 1/02* (2006.01)
(Continued)

(52) U.S. Cl.

CPC .......... *G10L 21/0216* (2013.01); *H04R 1/028* (2013.01); *H04R 1/1041* (2013.01);
(Continued)

(58) Field of Classification Search

CPC . H04R 1/20; H04R 1/32; H04R 1/326; H04R 1/40; H04R 25/00; H04R 25/40;
(Continued)

(56) References Cited

U.S. PATENT DOCUMENTS 6,327,370 B1 12/2001 Killion et al.
8,867,763 B2 10/2014 Bouse
(Continued)

FOREIGN PATENT DOCUMENTS

CN 105765486 7/2016
CN 108694956 10/2018
EP 3416407 12/2018

OTHER PUBLICATIONS

Non-Final Office Action for U.S. Appl. No. 16/667,883 dated Dec. 9, 2020.

(Continued)

*Primary Examiner* — Walter F Briney, III

(74) *Attorney, Agent, or Firm* — Vista IP Law Group, LLP

(57) ABSTRACT

A hearing device includes: a first microphone and a second microphone for provision of a first microphone input signal and a second microphone input signal, respectively; a beamforming module configured to process the first microphone input signal and the second microphone input signal, the beamforming module configured to provide a beamformed input signal; a processor configured to process the beamformed input signal for provision of an electrical output signal based on the beamformed input signal from the beamforming module; a receiver configured to convert the electrical output signal to an audio output signal; and a motion detector; wherein the beamforming module comprises a beamforming controller coupled to the motion detector, and wherein the beamforming controller is configured to control the beamforming module based on motion data from the motion detector.

21 Claims, 2 Drawing Sheets

(51) Int. Cl.
*H04R 1/10* (2026.01)
*H04R 3/00* (2006.01)
*H04R 25/00* (2006.01)

(52) U.S. Cl.
CPC ........... *H04R 3/005* (2013.01); *H04R 25/407* (2013.01); *G10L 2021/02166* (2013.01); *H04R 2225/55* (2013.01)

(58) Field of Classification Search
CPC H04R 25/405; H04R 25/407; H04R 2201/40; H04R 2201/401; H04R 2201/403; H04R 2225/41; H04R 2430/00; H04R 2430/20; H04R 2430/21; H04R 2430/23; H04R 2460/00; G10K 2210/111; G10K 2200/10
See application file for complete search history.

(56) References Cited

U.S. PATENT DOCUMENTS

| | | | | |
|---|---|---|---|---|
| 2013/0329923 | A1* | 12/2013 | Bouse | H04R 25/40 381/313 |
| 2015/0088500 | A1 | 3/2015 | Conliffe | |
| 2017/0221500 | A1* | 8/2017 | Glasgow | H04R 29/005 |
| 2018/0270571 | A1 | 9/2018 | Di Censo et al. | |
| 2019/0028817 | A1* | 1/2019 | Gabai | H04R 25/407 |
| 2019/0394576 | A1* | 12/2019 | Petersen | H04R 25/356 |
| 2020/0128322 | A1* | 4/2020 | Sabin | G06F 3/012 |

OTHER PUBLICATIONS

Non-Final Office Action for U.S. Appl. No. 16/667,883 dated Mar. 23, 2022.

Final Office Action for U.S. Appl. No. 16/667,883 dated Jul. 30, 2021.

Notice of Allowance for US. Appl. No. 16/667,883 dated Nov. 16, 2022.

Extended European Search Report dated Jun. 13, 2019 for corresponding European Application No. 18214347.9.

Foreign OA for CN Patent Appln. No. 201911306825.5 dated Aug. 3, 2023.

Foreign Search Report for CN Patent Appln. No. 201911306825.5 dated Apr. 4, 2024 (with English translation).

* cited by examiner

HEARING DEVICE WITH ACCELERATION-BASED BEAMFORMING

RELATED APPLICATION DATA

This application is a continuation of U.S. patent application Ser. No. 16/667,883 filed on Oct. 29, 2019, which claims priority to, and the benefit of, European Patent Application No. 18214347.9 filed on Dec. 20, 2018. The entire disclosure of the above application is expressly incorporated by reference herein.

FIELD

The present disclosure relates to a hearing device with adaptive processing and in particular to a hearing device with acceleration-based processing and related methods including a method of operating a hearing device.

BACKGROUND

Environments where multiple sources provide audio signals continue to present a challenge to hearing device users and hearing device manufacturers.

SUMMARY

Accordingly, there is a need for hearing devices and methods with improved capability of adaption to different listening situations.

A hearing device is disclosed, the hearing device comprising a set of microphones comprising a first microphone and/or a second microphone for provision of a first microphone input signal and a second microphone input signal, respectively; a beamforming module connected to the first microphone and/or the second microphone for processing the first microphone input signal and/or the second microphone input signal, the beamforming module configured to provide a beamformed input signal; a processor for processing the beamformed input signal for provision of an electrical output signal based on the beamformed input signal from the beamforming module; a receiver for converting the electrical output signal to an audio output signal; and an optional motion detector, wherein the beamforming module comprises a beamforming controller connected to the motion detector. The beamforming controller is optionally configured to control the beamforming module based on motion data from the motion detector.

Further, a method of operating a hearing device is disclosed, the method comprising: obtaining a first input signal and a second input signal; applying a beamforming mode to the first input signal and the second input signal for provision of a beamformed input signal; processing the beamformed input signal for provision of an electrical output signal based on the beamformed input signal; and converting the electrical output signal to an audio output signal. The method optionally comprises obtaining motion data and adjusting the beamforming mode based on the motion data.

The present disclosure allows for improved listening experience by automatically detecting a user focus and adjusting beamforming. Further, improved control of situations where a user of a hearing device is in a noisy environment where it may be advantageous to spatially focus the hearing device to a specific sound source. This may e.g. be advantageous if a user of the hearing device is in a social setting, such as in a cocktail party environment, where there are a number of people surrounding the user that are talking.

It is an advantage of the present disclosure that beamforming processing of microphone input signals is automatically adjusted when a user focuses on a source and optionally only when there is a need for beamforming e.g. when the user is in a noisy environment. Only applying beamforming when necessary may lead to a power-efficient hearing device while still providing a satisfactory listening experience.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1:
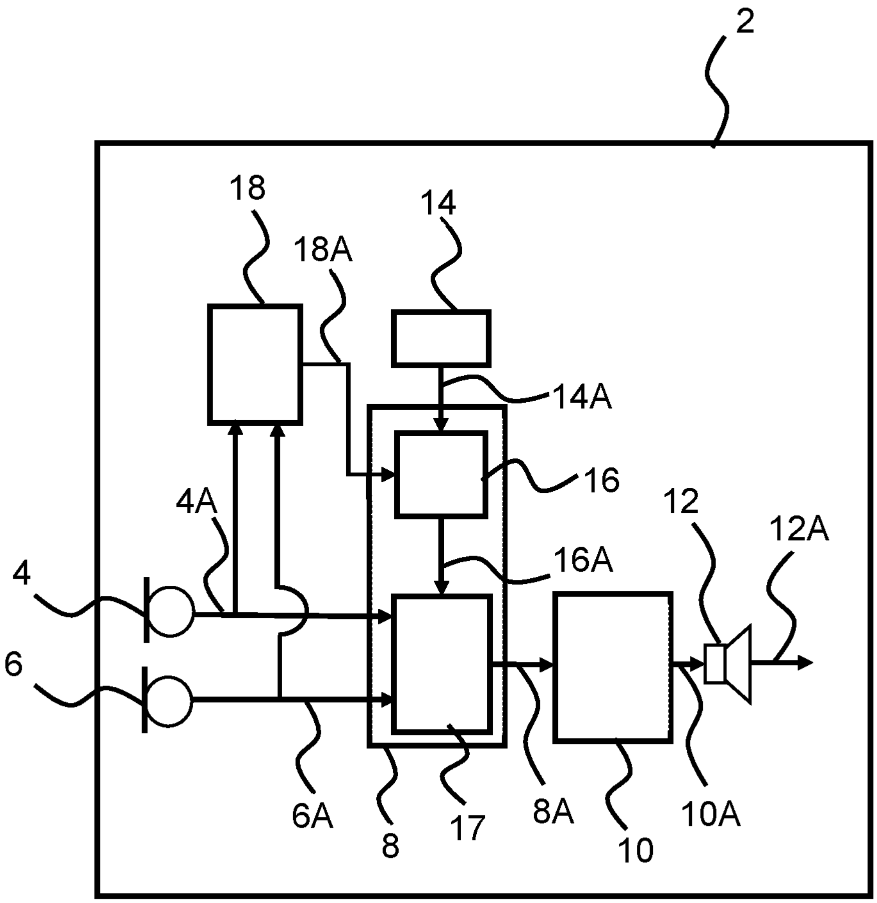
FIG. 1 schematically illustrates an exemplary hearing device according to the present disclosure.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

A hearing device is disclosed. The hearing device may be a hearable or a hearing aid, wherein the processor is configured to compensate for a hearing loss of a user. The hearing device may be of the behind-the-ear (BTE) type, in-the-ear (ITE) type, in-the-canal (ITC) type, receiver-in-canal (RIC) type or receiver-in-the-ear (RITE) type. The hearing aid may be a binaural hearing aid.

A hearing device is disclosed. The hearing device comprises a set of microphones comprising a first microphone and a second microphone for provision of a first microphone input signal and a second microphone input signal, respectively.

The hearing device comprises a beamforming module connected to the first microphone and the second microphone for processing the first microphone input signal and the second microphone input signal. The beamforming module is configured to provide a beamformed input signal.

The hearing device comprises a processor for processing the beamformed input signals for provision of an electrical output signal based on the beamformed input signal from the beamforming module; and a receiver for converting the electrical output signal to an audio output signal.

The hearing device comprises a motion detector. The motion detector may be a head motion detector and may comprise an accelerometer, a gyroscope and/or a compass.

The beamforming module comprises a beamforming controller connected to the motion detector. The beamforming controller is configured to control the beamforming module based on motion data from the motion detector, such as based on accelerometer data from accelerometer. For example, the beamforming controller may be configured to control one or more beamformers such as a plurality of beamformers of the beamforming module to apply a first beamforming mode, such as omnidirectional beamforming or a first directional beamforming, based on the motion data, e.g. the accelerometer data. Further, the beamforming controller may be configured to control one or more beamformers of the beamforming module to apply a second beamforming mode, such as omnidirectional beamforming or a second directional beamforming, based on the motion data, e.g. the accelerometer data. The second beamforming mode may include a combination of modes e.g. a combination of omni with a directional mode such as a first directional mode. The second beamforming mode is different from the first beamforming mode. The beamforming controller may be connected to the processor, e.g. for receiving control signal(s) from the processor, thus allowing the processor to control the beamforming of the hearing device.

The beamforming controller may be configured to apply a default beamforming mode, such as omni, in accordance with no focus criterion being satisfied.

Thus, the beamforming action of the hearing device is controlled at least in part by receiving data from the motion detector, e.g. the accelerometer, where at least a part of data from the motion detector, e.g. accelerometer, can activate a predefined control of the beamforming controller, which activates a predefined beamforming mode. The beamforming controller receives motion data from the motion detector and the beamforming controller is configured to control the beamforming module based on the motion data. In one or more exemplary hearing devices, the beamforming controller may receive the motion data from the motion detector and activate a first beamforming mode based at least partly on the information received from the motion detector.

By controlling the beamforming module at least in part using motion data, the beamforming module may operate in a energy efficient way, as the beamforming module may require a significant amount of energy to operate the beamforming module. Thus, by utilizing the motion data, the beamforming controller may e.g. prevent a beamforming of the hearing device, if the motion data indicates that the beamforming module may operate in a low energy mode, rather than a high energy mode.

Further, applying beamforming in a situation where the user does not focus may be unappealing due to the loss of omnidirectional audio information due to the beamforming. It is an advantage of the present disclosure that an improved beamforming processing is applied in the hearing device, in turn providing an improved listening experience.

In one or more exemplary hearing devices, the beamforming controller is configured to determine a first movement parameter and/or a plurality of movement parameters based on the motion data. The beamforming controller is optionally configured to control the beamforming module based on the first movement parameter and/or the plurality of movement parameters. The first movement parameter, also denoted MP_1, may be indicative of movement of the hearing device, e.g. where a low value is indicative of no or little movement and a high value is indicative of substantial movement. The first movement parameter, also denoted MP_1, may be indicative of head rotation of the user's head, e.g. where a low value is indicative of no or little head rotation and a high value is indicative of substantial rotation.

The beamforming controller may be adapted to receive the motion data and be configured to determine the first movement parameter based on the motion data. In one or more exemplary hearing devices, the motion detector may provide the first movement parameter to the beamforming controller. The movement parameter(s) may e.g. indicate whether the hearing device/head of the user is in motion, whether the hearing device/head of the user rotates, whether the hearing device/head of the user is still, whether the hearing device/head of the user is accelerating or decelerating in one or more directions, and/or whether the hearing device/head of the user is in constant motion. The first movement parameter may be based on one or more temporal periods, where the motion data may reflect a specific and/or predetermined movement type, which may be recognized by the beamforming controller. Thus, the beamforming controller may continuously monitor motion data from the motion detector.

The hearing device may utilize the motion data from the motion detector to recognize a certain movement characteristic of the hearing device. The movement parameter(s) may be defined by a certain type of pattern of movement registered by the motion detector. For example, in case the motion detector provides motion data indicative of a reduction in acceleration, e.g. small or no accelerations of the hearing device, the motion detector might be registering a certain type of movement, or a lack thereof, where the movement may be seen as the movement of the head of the user wearing the hearing device.

In one or more exemplary hearing devices, the motion detector may comprise an accelerometer wherein the beamforming controller may be configured to control the beamforming module based on accelerometer data from the accelerometer. Thus, the accelerometer data may indicate the spatial positioning of the hearing device which may provide the beamforming controller a further data input to control the beamforming module of the hearing device.

In one or more exemplary hearing devices, the motion detector may comprise a gyroscope wherein the beamforming controller may be configured to control the beamforming module based on gyroscope data from the gyroscope. Thus, the gyroscope data may indicate the spatial positioning of the hearing device which may provide the beamforming controller a further data input to control the beamforming module of the hearing device.

In one or more exemplary hearing devices, the beamforming controller may comprise a noise estimator for provision of a noise parameter indicative of a noise level, and wherein the beamforming controller is configured to control the beamforming module based on the noise parameter. The noise parameter may be based on the first microphone input signal and/or the second microphone input signal, i.e. the noise estimator may be connected to the first microphone and/or the second microphone. Thereby, the beamforming applied in the hearing device may be controlled based on a noise level, allowing the beamforming controller to only apply a beamforming scheme when the noise level is high such as above a (first) noise threshold, or even select a specific beamforming scheme adapted to a specific noise level.

Thus, in case the noise surrounding the hearing device is relatively low such as below a noise threshold, e.g. first noise threshold or second threshold, the noise parameter may have a low value, where the low value of the noise parameter may be used as a parameter to determine, whether the beamforming controller performs a beamforming of the microphone input signals. This means that if the hearing device is in a low noise environment, it might not be necessary for the beamforming controller to control the beamforming module to perform a beamforming of the first microphone input signal and/or the second microphone input signal, as first microphone input signals and/or the second microphone input signals without beamforming enable a user to distinguish a single sound source in a low noise environment. However, if the noise parameter is high, it may be difficult to distinguish a first sound source from a second sound source. This means therefore that in a high noise environment, it may be advantageous for the beamforming controller to initiate the beamforming of the first microphone input signal and/or the second microphone input signal, in order to separate the first sound source from the other sound source.

The motion data may further be utilized by the beamforming controller to estimate whether it is necessary to initiate the beamforming by the beamforming module, as the motion data may indicate whether the user of the hearing device is moving around or whether the motion data indicates that the user or the head of the user is still, which might indicate that the user is looking or focusing at a sound source, e.g. another person. Thus, the motion data may be utilized to provide motion data to indicate a state or a condition of the hearing device and/or the user.

In one or more exemplary hearing devices, the beamforming controller is configured to determine if one or more focus criteria including a first focus criterion are satisfied. In accordance with the first focus criterion being satisfied, the beamforming controller may be configured to apply a first beamforming mode in the beamforming module, e.g. by sending a first control signal to one or more beamformers of the beamforming module. The beamforming controller may be configured to control one or more beamformers of the beamforming module, where the beamforming controller may be configured to assess one or more focus criteria for controlling the beamforming module. The focus criteria may be based on a one or more movement parameters and/or one or more noise parameters, where the parameters may be continuously or selectively monitored during the use of the hearing device. The parameter(s) may alternatively be monitored with certain intervals.

The first focus criterion may be based on one or more movement parameters MP_1, MP_2, etc. and/or the noise parameter NP. In one or more exemplary hearing devices, the noise estimator is configured to provide a plurality of noise parameters NP_1, NP_2 etc, wherein the beamforming controller is configured to control the beamforming module based on the plurality of noise parameters.

In one or more exemplary hearing devices/methods, the first focus criterion may be given by:

$$MP\_1 < TH\_M\_1,$$

wherein MP_1 is indicative of a head rotation of the head of the user of the hearing device, TH_M_1 is a first movement threshold, and where a low value of MP_1 is indicative of little rotation of the hearing device/head and a high value of MP_1 is indicative of large rotation of the hearing device/head.

In one or more exemplary hearing devices/methods, the first focus criterion may be given by:

$$MP\_1 < TH\_1 \text{ AND } NP > TH\_N\_1,$$

wherein MP_1 is indicative of a head rotation of the head of the user of the hearing device, TH_M_1 is a first movement threshold, and where a low value of MP_1 is indicative of little rotation of the hearing device/head and a high value of MP_1 is indicative of large rotation of the hearing device/head. NP is the noise parameter indicative noise level, TH_N_1 is a first noise threshold, and where a low value of NP is indicative of low noise level and a high value of NP is indicative of high noise level.

The first focus criterion may be based on two or more parameters, such as one or more movement parameters and one or more noise parameters In one or more exemplary hearing devices, the first focus criterion is optionally based on the first movement parameter. The first movement parameter may be based on motion data, where the first movement parameter may at least partly represent the movement/rotation of the hearing device, or may alternatively represent the lack of movement/rotation of the hearing device. The beamforming controller may receive the first movement parameter as an input, where the beamforming controller may determine whether the first movement parameter satisfies the first focus criterion based on the first movement parameter. If the beamforming controller determines that the first movement parameter satisfies the first focus criterion, the beamforming controller may initiate the beamformer to activate beamforming of the first microphone input signal and the second microphone input signal. If the beamforming controller determines that the first movement parameter does not fulfil the first focus criterion the beamforming controller may instruct the beamformers not to activate beamforming, e.g. apply an omni-directional mode.

In one or more exemplary hearing devices, the beamforming controller may monitor the status of the beamforming module, where the beamforming controller may be configured to control the beamforming module based on the current status of the beamforming module. Thus, the beamforming controller may determine the control action of the beamforming module based on the current status of the beamforming module. This means that e.g. the same values of the first movement parameter and/or noise parameter may be handled in one way if the beamforming module is in a first beamforming mode, and in different way if the beamforming controller is in another, e.g. second, beamforming mode.

In one or more exemplary hearing devices, the first focus criterion is based on the noise parameter(s). The noise parameter may be utilized as a focus criterion for the beamforming controller to determine the control of the beamforming module, where the noise criterion may e.g. negate or confirm the control of the beamforming module based on the noise parameter. This effectively means that if the noise parameter is determined as having an effect on the beamforming action, the beamforming controller may use the motion data to control the beamforming module, where the noise parameter may influence the control of the beamforming module by providing an additional input for the control of the beamforming module. Accordingly, the noise parameter may be used for providing a more efficient and power-effective beamforming in the hearing device and at the same time avoiding beamforming when beamforming is not necessary. Thus, if the noise parameter is below a certain threshold, while the motion data may indicate a focussing, the noise parameter may be used as an additional condition to apply a beamforming. Thus, if the hearing device is in a very noisy environment, the beamforming module may operate in a different manner than if the hearing device is in a quiet environment with the same acceleration data.

In one or more exemplary hearing devices/methods, the first focus criterion may be based on the first movement parameter and on the noise parameter. This effectively means that the beamforming controller may have more than one focus criterion, where two or more focus criteria may be configured to allow the beamforming controller to control the beamforming module and/or the beamforming of the beamforming module. The first and second focus criterion may be independent of each other, where the first focus criterion does not influence the second focus criterion, and vice versa. The beamforming controller may weigh the first focus criterion against the second focus criterion in order to provide control to the beamforming module.

The first focus criterion may e.g. be based on movement parameters and/or noise parameter(s) where the first focus criterion defines more than one threshold for one or more parameters, i.e. the first focus criterion may define a respective range for one or more parameters.

In one or more exemplary hearing devices, to apply a first beamforming mode in the beamforming module comprises to increase the directionality of a current beamforming mode of beamforming module. The beamforming module may have a beamforming mode where the beamforming module applies a predetermined directionality. The first beamforming mode may be adapted to provide an increase in the directionality of the present beamforming mode, where the increase in directionality may filter out sounds that are not in the area in which the beamforming module focusses the directionality of the beamforming module. In one or more examples, the current directionality/beamforming mode of the beamforming module may be an omnidirectional mode, where the first beamforming mode may increase the directionality of the beamforming module from an omnidirectional mode to the first beamforming mode, where the beamforming module may provide a spatial filtering of the sound which is received by the first and/or the second microphone.

In one or more exemplary hearing devices, the beamforming controller is configured to determine if a second focus criterion is satisfied. In accordance with the second focus criterion being satisfied, the beamforming controller may be configured to apply a second beamforming mode in the beamforming module, e.g. by sending a second control signal to one or more beamformers of the beamforming module. The second focus criterion is optionally based on the first movement parameter. To apply a second beamforming mode may comprise to apply an omnidirectional beamforming mode.

The second focus criterion may be different from the first focus criterion. The second focus criterion may be based on one or more movement parameters including the first movement parameter and/or be based on the noise parameter(s). In one or more exemplary hearing devices, the beamforming controller may determine whether the second focus criterion is satisfied. If the beamforming controller determines that the second focus criterion is satisfied, the beamforming controller may control the beamformer to apply a second beamforming mode, such as omni-directional mode.

The second focus criterion may be based on one or more parameters that may e.g. be determined in the hearing device.

The second focus criterion may e.g. be based on movement parameters and/or noise parameter(s) where the second focus criterion optionally defines more than one threshold for one or more parameters, i.e. the second focus criterion may define a respective range for one or more parameters. This means that for the second focus criterion to be satisfied, a parameter may be required to be larger than a first threshold and less than a second threshold, which means that the parameter may be required in a certain range.

For example, where the second focus criterion may be based on a movement parameter, the second focus criterion may require the movement parameter to be larger than a first threshold parameter and lower than a second threshold parameter in order to satisfy the second focus criterion. This means that if the motion detector provides a movement parameter that indicates a certain type of movement which is defined by the threshold values, the beamforming controller will instruct the beamforming module to apply a second beamforming mode.

In one or more exemplary hearing devices/methods, the second focus criterion may be given by:

$$MP\_1 > TH\_M\_1,$$

wherein MP_1 is indicative of a head rotation of the head of the user of the hearing device, TH_M_1 is a first movement threshold, and where a low value of MP_1 is indicative of little rotation of the hearing device/head and a high value of MP_1 is indicative of large rotation of the hearing device/head.

In one or more exemplary hearing devices/methods, the second focus criterion may be given by:

$$MP\_1 > TH\_M\_2 \text{ AND/OR } NP < TH\_N\_2,$$

wherein MP_1 is indicative of a head rotation of the head of the user of the hearing device, TH_M_2 is a second movement threshold, and where a low value of MP_1 is indicative of little rotation of the hearing device/head and a high value of MP_1 is indicative of large rotation of the hearing device/head. NP is the noise parameter indicative noise level, TH_N_2 is a second noise threshold, and where a low value of NP is indicative of low noise level and a high value of NP is indicative of high noise level.

Thus, by providing a first focus criterion and a second focus criterion for the control of the beamforming in the hearing device, the hearing device can react in different ways to different situations.

The first and/or the second focus criterion may be selectively activated in the hearing device, so that the hearing device may be manually and/or automatically adjusted to operate within a predefined mode when necessary.

In one or more exemplary hearing devices, the second focus criterion is based on the noise parameter. In case where the second focus criterion may be based on the noise parameter, the second focus criterion may require that the noise parameter is larger than a first noise threshold and is less than a second noise threshold in order to satisfy the second focus criterion. This means that if the noise indicates a certain level of noise which is defined by the threshold values, the beamforming controller will instruct the beamforming module to apply the second beamforming mode.

In one or more exemplary hearing devices, to apply a second beamforming mode in the beamforming module comprises to reduce the directionality of a current beamforming mode, e.g. first beamforming mode, of beamforming module. This means that if the second focus criterion is satisfied, the beamforming module may reduce the directionality of the beamforming mode applied in the hearing device, so that the beamforming goes e.g. from a directional mode and reduces the directionality by transforming the beamforming mode in the direction towards a omnidirectional mode. This may e.g. occur when the movement parameter indicates that the hearing device is relatively still/motionless, and where the noise parameter is below a certain level, it may not be necessary to apply a beamforming mode where the beamforming mode is directional, due to the fact that there is a lack of presence of interfering sounds in the vicinity of the hearing device. Thus, the second criterion may e.g. be adapted to provide an energy saving function for the hearing device, as the provision of an increase of directionality by the beamforming module requires more processing than the provision of a decreased directionality, which means that the energy requirement of the beamforming module is reduced when the second focus criteria is satisfied.

In one or more exemplary hearing devices, the beamforming controller is configured to determine if a third focus criterion is satisfied; and in accordance with the third focus criterion being satisfied, apply a third beamforming mode in the beamforming module.

The third focus criterion may be based on the first movement parameter and/or the noise parameter and is indicative of the user slightly moving the hearing device/head or the hearing device being in an environment with medium noise, i.e. the third focus criterion may be given by $$(TH\_M\_1 < \mathrm{MP\_1} < TH\_M\_2) \text{ AND/OR } (TH\_N\_2 < \mathrm{NP} < TH\_N\_1)$$

wherein MP_1 is indicative of a head rotation of the head of the user of the hearing device, TH_M_1 and TH_M_2 are movement thresholds, and where a low value of MP_1 is indicative of little rotation of the hearing device/head and a high value of MP_1 is indicative of large rotation of the hearing device/head. NP is the noise parameter indicative noise level, TH_N_1 and TH_N_2 are noise thresholds, and where a low value of NP is indicative of low noise level and a high value of NP is indicative of high noise level.

In one or more exemplary hearing devices, the beamforming controller is configured to determine if a fourth focus criterion is satisfied; and in accordance with the fourth focus criterion being satisfied, apply a fourth beamforming mode in the beamforming module.

The third focus criterion and/or the fourth focus criterion may be based on the noise parameter(s). The third focus criterion and/or the fourth focus criterion may be based on one or more movement parameter(s).

Also disclosed is a method of operating a hearing device. The method comprises obtaining a first input signal and a second input signal; applying a beamforming mode to the first input signal and the second input signal for provision of a beamformed input signal; processing the beamformed input signal for provision of an electrical output signal based on the beamformed input signal; and converting the electrical output signal to an audio output signal. The method comprises obtaining motion data and optionally adjusting the beamforming mode based on the motion data.

Thus, the beamforming of the hearing device may be controlled at least in part based on motion data from the motion detector, where the motion data from the motion detector can activate a predefined control of the beamforming controller in order to apply a beamforming mode. The beamforming controller may receive motion data from the motion detector and the beamforming controller is configured to control beamformer(s) of the beamforming module based on the motion data from the motion detector. In one example, the beamforming controller may receive the motion data from the motion detector and activate a first beamforming mode based at least partly on the information received from the motion detector.

By controlling the beamforming module at least in part using motion data, the method of controlling the hearing device may be performed in an energy efficient way, as the beamforming module may require a significant amount of energy to operate the beamforming module. Thus, by utilizing the motion data, the beamforming controller may e.g. prevent a beamforming of the hearing device, if the motion data indicates that the beamforming module may operate in a low energy mode, rather than a high energy mode.

The method may comprise obtaining a noise parameter indicative of noise level and optionally adjusting the beamforming mode based on the noise parameter.

Thus, if the noise surrounding the hearing device is relatively high, the noise parameter may have a high value such as above a noise threshold, where the high value of the noise parameter may be used as an indicator for the method to apply a first beamforming mode. In a scenario where the noise surrounding the hearing device is relatively low, the noise parameter may have a low value, where the low value of the noise parameter may be used as an indicator for the method to determine a second beamforming mode, e.g. an omni-directional mode. This means that if the hearing device is in a low noise environment, it might not be necessary for the beamforming controller to control the beamforming module to perform a beamforming of the first microphone input signal and/or the second microphone input signal, as an omni-directional mode can easily distinguish a single sound source in a low noise environment. However, if the noise parameter is high, it may be difficult to distinguish a first sound source from other sound sources. This means that in a high noise environment, it may be advantageous for the beamforming controller to initiate the beamforming of the first microphone input signal and/or the second microphone input signal, in order to separate the first sound source from the other sound sources.

The motion data may further be utilized by the beamforming controller to estimate whether it is necessary to initiate the beamforming by the beamforming module, as the motion data may indicate whether the user of the hearing device is moving around or whether the motion data indicates that the user or the head of the user is still, which might indicate that the user is looking at a sound source, e.g. another person. Thus, the motion data may be utilized to provide data to indicate a focusing state or a focus condition of the hearing device and/or the user.

The method optionally comprises determining if one or more focus criteria including a first focus criterion are satisfied. The method may comprise, in accordance with the first focus criterion being satisfied, applying a first beamforming mode to the first input signal and the second input signal.

The method may comprise applying a default beamforming mode, such as omni, in accordance with none of the one or more focus criteria being satisfied.

In one or more exemplary methods, applying a first beamforming mode in the beamforming module comprises to increase the directionality of the current beamforming mode. The beamforming module may have a beamforming mode where the beamforming module applies a predetermined directionality. The first beamforming mode may be adapted to provide an increase in the directionality of the present beamforming mode, where the increase in directionality may filter out sounds that are not in the area in which the beamforming module focus the directionality of the beamforming module. In one or more examples, the current directionality of the beamforming module may be an omnidirectional mode, where the first beamforming mode may increase the directionality of the beamforming module from an omnidirectional mode to a more directional mode where the beamforming module may provide a spatial filtering of the sound which is received by the first and/or the second microphone.

The method optionally comprises determining if a second focus criterion is satisfied. The method may comprise, in accordance with the second focus criterion being satisfied, applying a second beamforming mode to the first input signal and the second input signal.

In one or more exemplary methods, applying a second beamforming mode in the beamforming module comprises to reduce the directionality of the current beamforming mode. Applying a second beamforming mode may comprise applying an omnidirectional beamforming mode.

FIG. 1 shows an exemplary hearing device 2 comprising a set of microphones comprising a first microphone 4 and a second microphone 6 for provision of a first microphone input signal 4A and a second microphone input signal 6A, respectively. The hearing device 2 comprises a beamforming module 8 connected to the first microphone 4 and the second microphone 6 for processing the first microphone input signal 4A and the second microphone input signal 6A, the beamforming module configured to provide a beamformed input signal 8A. Further, the hearing device comprises a processor 10 for processing the beamformed input signal 8A for provision of an electrical output signal 10A based on the beamformed input signal 8A from the beamforming module 8. The hearing device 2 comprises a receiver 12 for converting the electrical output signal 10A to an audio output signal 12A. Further, hearing device 2 comprises a motion detector 14 for provision of motion data 14A.

The beamforming module 8/hearing device 2 comprises a beamforming controller 16 connected to the motion detector 14. The beamforming controller 16 is configured to control the beamforming module 8, e.g. a beamformer 17 of the beamforming module, based on the motion data 14A from the motion detector 14. Thus, the motion data 14A may be utilized to provide a control input 16A for the beamformer 17 of the beamforming module 8 from the beamforming controller 16.

The hearing device 2 optionally comprises a noise estimator 18, where the noise estimator 18 is connected to the first microphone 4 and/or the second microphone 6, where the noise estimator 18 is connected to the beamforming controller 16 and configured to provide one or more noise parameters 18A indicative of noise that may be present in the first microphone input signal 4A and/or the second microphone input signal 6A to the beamforming controller. The beamforming controller 16 is optionally configured to control the beamforming module 8, e.g. a beamformer 17 of the beamforming module, based on the noise parameter(s) 18A from the noise estimator 18.

The beamforming controller 16 is configured to determine if one or more focus criteria including a first focus criterion FC_1 are satisfied. In accordance with the first focus criterion being satisfied, the beamforming controller 16 is configured to apply a first beamforming mode BM_1 in the beamforming module 8, e.g. by beamforming control signal 16A comprising beamforming parameters, e.g. filter coefficients and/or delays, for the beamformer 17 or by beamforming control signal 16A comprising a beamforming mode identifier indicative of the beamforming mode for the beamformer 17. The first beamforming mode may have a high directionality.

The first focus criterion FC_1 is based on the first movement parameter and the noise parameter and is indicative of the user focusing on a sound source (no or little movement of hearing device/head) in an environment with high noise, i.e. the first focus criterion is given by $$MP\_1 < TH\_M\_1 \text{ AND } NP > TH\_N\_1$$

wherein MP_1 is indicative of a head rotation of the head of the user of the hearing device, TH_M_1 is a first movement threshold, and where a low value of MP_1 is indicative of little rotation of the hearing device/head and a high value of MP_1 is indicative of large rotation of the hearing device/head. NP is the noise parameter indicative noise level, TH_N_1 is a first noise threshold, and where a low value of NP is indicative of low noise level and a high value of NP is indicative of high noise level.

The beamforming controller 16 is configured to determine if a second focus criterion FC_2 is satisfied. In accordance with the second focus criterion being satisfied, the beamforming controller 16 is configured to apply a second beamforming mode BM_2 in the beamforming module 8, e.g. by beamforming control signal 16A comprising beamforming parameters, e.g. filter coefficients and/or delays, for the beamformer 17 or by beamforming control signal 16A comprising a beamforming mode identifier indicative of the beamforming mode for the beamformer 17. The second beamforming mode may have a low or no directionality. The second beamforming mode may be an omni-directional mode.

The second focus criterion FC_2 is based on the first movement parameter and the noise parameter and is indicative of the user moving the hearing device/head or the hearing device being in an environment with low noise, i.e. the second focus criterion is given by $$MP\_1 > TH\_M\_2 \text{ OR } NP < TH\_N\_2$$

wherein MP_1 is indicative of head rotation of the hearing device, TH_M_2 is a second movement threshold, and where a low value of MP_1 is indicative of little rotation of the hearing device/head and a high value of MP_1 is indicative of large rotation of the hearing device/head. NP is the noise parameter indicative noise level, TH_N_2 is a second noise threshold, and where a low value of NP is indicative of low noise level and a high value of NP is indicative of high noise level.

The beamforming controller 16 is optionally configured to determine if a third focus criterion FC_3 is satisfied. In accordance with the third focus criterion being satisfied, the beamforming controller 16 is configured to apply a third beamforming mode BM_3 in the beamforming module 8, e.g. by beamforming control signal 16A comprising beamforming parameters, e.g. filter coefficients and/or delays, for the beamformer 17 or by beamforming control signal 16A comprising a beamforming mode identifier indicative of the beamforming mode for the beamformer 17. The third beamforming mode may have a medium directionality, i.e. the third beamforming mode may have a smaller directionality than the first beamforming mode and/or a higher directionality than the second beamforming mode.

The third focus criterion FC_3 is based on the first movement parameter and the noise parameter and is indicative of the user moving a bit in an environment with medium noise, i.e. the third focus criterion is given by $$(TH\_M\_1 < MP\_1 < TH\_M\_2) \text{ AND } (TH\_N\_2 < NP < TH\_N\_1)$$

wherein MP_1 is indicative of head rotation of the hearing device, TH_M_1 and TH_M_2 are movement thresholds, and where a low value of MP_1 is indicative of little rotation of the hearing device/head and a high value of MP_1 is indicative of large rotation of the hearing device/head. NP is the noise parameter indicative noise level, TH_N_1 and TH_N2 are noise thresholds, and where a low value of NP is indicative of low noise level and a high value of NP is indicative of high noise level.

Figure 2:
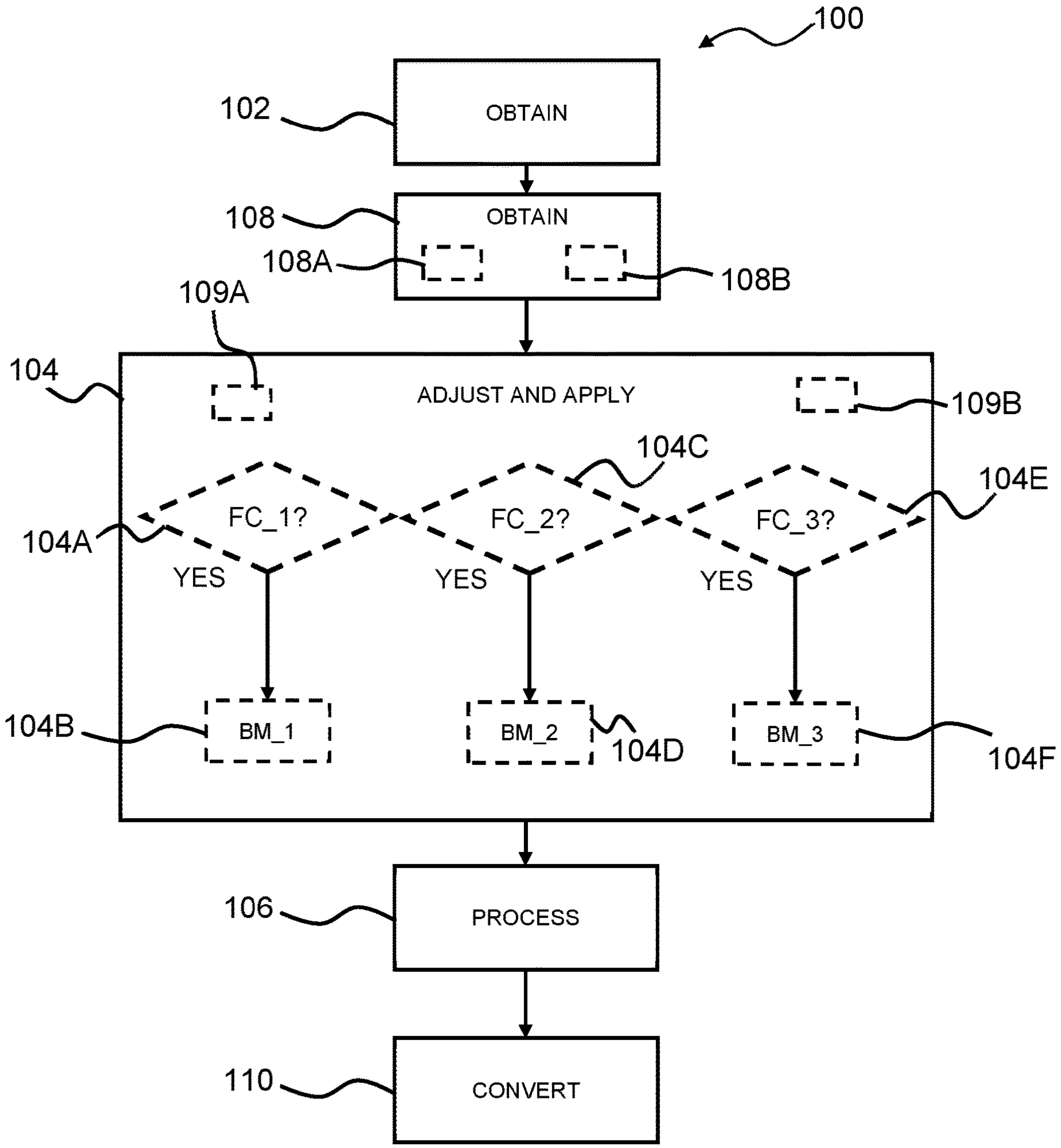
FIG. 2 is a flow diagram of an exemplary method according to the disclosure.

FIG. 2. shows a flow diagram of an exemplary method of operating a hearing device. The method 100 comprises obtaining 102 a first input signal and a second input signal; applying 104 a beamforming mode to the first input signal and the second input signal for provision of a beamformed input signal; processing 106 the beamformed input signal for provision of an electrical output signal based on the beamformed input signal; and converting 110 the electrical output signal to an audio output signal. The method comprises obtaining 108 data and/or parameter used for control of the beamforming. The method 100 optionally comprises obtaining 108A motion data and adjusting 109A the beamforming mode based on the motion data. The method 100 optionally comprises obtaining 108B a noise parameter indicative of noise level and adjusting 109B the beamforming mode based on the noise parameter.

The method 100 comprises determining 104A if a first focus criterion FC_1 is satisfied; and in accordance with the first focus criterion being satisfied, applying 104B a first beamforming mode BM_1 to the first input signal and the second input signal.

The method 100 optionally comprises determining 104C if a second focus criterion FC_2 is satisfied; and in accordance with the second focus criterion being satisfied, applying 104D a second beamforming mode BM_2 to the first input signal and the second input signal.

The method 100 optionally comprises determining 104E if a third focus criterion FC_3 is satisfied; and in accordance with the third focus criterion being satisfied, applying 104F a third beamforming mode BM_3 to the first input signal and the second input signal.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering.

Furthermore, the labelling of a first element does not imply the presence of a second element and vice versa.

It may be appreciated that FIGS. 1-2 comprise some modules or operations which are illustrated with a solid line and some modules or operations which are illustrated with a dashed line. The modules or operations which are comprised in a solid line are modules or operations which are comprised in the broadest example embodiment. The modules or operations which are comprised in a dashed line are example embodiments which may be comprised in, or a part of, or are further modules or operations which may be taken in addition to the modules or operations of the solid line example embodiments. It should be appreciated that these operations need not be performed in order presented. Furthermore, it should be appreciated that not all of the operations need to be performed. The exemplary operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the exemplary embodiments may be implemented at least in part by means of both hardware and software, and that several "means", "units" or "devices" may be represented by the same item of hardware.

The various exemplary methods, devices, and systems described herein are described in the general context of method steps processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform specified tasks or implement specific abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications, and equivalents.

LIST OF REFERENCES

2 hearing device
4 first microphone
4A first microphone input signal
6 second microphone
6A second microphone input signal
8 beamforming module
8A beamformed input signal
10 processor
10A electrical output signal
12 receiver
12A audio output signal
14 motion detector
14A motion data
16 beamforming controller
16A beamforming control signal
17 beamformer
18 noise estimator
18A noise parameter(s)
100 method of operating a hearing device
102 obtaining a first input signal and a second input signal
104 applying a beamforming mode to the first input signal and the second input signal for provision of a beamformed input signal
104A first focus criterion FC_1 satisfied?
104B applying a first beamforming mode BM_1 to the first input signal and the second input signal
104C second focus criterion FC_2 satisfied?
104D applying a second beamforming mode BM_2 to the first input signal and the second input signal
104E third focus criterion FC_3 satisfied?

104F applying a third beamforming mode BM_3 to the first input signal and the second input signal

106 processing the beamformed input signal for provision of an electrical output signal based on the beamformed input signal

108 obtaining data and/or parameter(s)

108A obtaining motion data

108B obtaining a noise parameter indicative of noise level

109A adjusting the beamforming mode based on the motion data

109B adjusting the beamforming mode based on the noise parameter

110 converting the electrical output signal to an audio output signal. The method 100

The invention claimed is:

1. A hearing device comprising:

a first microphone and a second microphone for provision of a first microphone input signal and a second microphone input signal, respectively;

a beamforming module configured to process the first microphone input signal and the second microphone input signal, the beamforming module configured to provide a beamformed input signal;

a processing unit configured for provision of an electrical output signal based on the beamformed input signal;

a receiver configured to provide an audio output signal based on the electrical output signal; and a motion detector configured to detect a movement of the hearing device;

wherein the hearing device is configured to:

determine whether a movement parameter MP corresponding with the detected movement satisfies a movement criterion that includes a movement threshold THM, determine whether a noise parameter NP satisfies a noise criterion that includes a noise threshold THN, and apply a first beamforming mode if the movement parameter MP satisfies the movement criterion, and if the noise parameter NP satisfies the noise criterion;

wherein the movement threshold THM of the movement criterion and the noise threshold THN of the noise criterion together form a first focus criterion; and wherein the hearing device is configured to determine if a second focus criterion is satisfied, wherein the second focus criterion comprises another movement threshold THM2 and another noise threshold THN2.

2. The hearing device according to claim 1, wherein the beamforming module comprises a beamforming controller.

3. The hearing device according to claim 2, wherein the beamforming controller comprises a noise estimator for provision of the noise parameter NP indicative of a noise level.

4. The hearing device according to claim 2, wherein the beamforming module comprises a beamformer, and wherein the beamforming controller is configured to control the beamformer of the beamforming module.

5. The hearing device according to claim 2, wherein the beamforming controller is coupled to the motion detector.

6. The hearing device according to claim 1, wherein the hearing device is configured to:

apply the first beamforming mode if the movement parameter MP is less than the movement threshold THM, and if the noise parameter NP is larger than the noise threshold THN.

7. The hearing device according to claim 1, wherein the movement parameter MP is based on motion data from the motion detector.

8. The hearing device according to claim 1, wherein the noise threshold THN is for detecting interfering sound.

9. The hearing device of claim 1, wherein the hearing device is a hearing aid configured for wear at or behind an ear of a user of the hearing device.

10. The hearing device of claim 1, wherein the hearing device is configured to determine if a third focus criterion is satisfied, the third focus criterion being different from the first focus criterion and the second criterion.

11. The hearing device of claim 1, wherein the hearing device is configured to apply the first beamforming mode by increasing a directionality of a current beamforming.

12. The hearing device of claim 1, wherein the hearing device is configured to apply a second beamforming mode if the movement parameter MP does not satisfy the movement criterion.

13. The hearing device of claim 12, wherein the hearing device is configured to apply the second beamforming mode by applying no beamforming directionality or by reducing a directionality of the current beamforming.

14. A method performed by a hearing device, comprising:

obtaining a first input signal and a second input signal;

processing, by a beamforming module, the first input signal and the second input signal for provision of a beamformed input signal;

providing an electrical output signal based on the beamformed input signal;

providing an audio output signal based on the electrical output signal;

detecting motion of the hearing device;

determining whether a movement parameter MP satisfies a movement criterion that includes a movement threshold THM, wherein the movement parameter MP corresponds with the detected motion;

determining whether a noise parameter NP satisfies a noise criterion that includes a noise threshold THN; and applying a first beamforming mode if the movement parameter MP satisfies the movement criterion, and if the noise parameter NP satisfies the noise criterion;

wherein the movement threshold THM of the movement criterion and the noise threshold THN of the noise criterion together form a first focus criterion; and wherein the method further comprises determining if a second focus criterion is satisfied, wherein the second focus criterion comprises another movement threshold THM2 and another noise threshold THN2.

15. The method according to claim 14, wherein an entirety of the hearing device with the beamforming module is configured for wear at a head of a user.

16. The method of claim 14, wherein the noise threshold THN is for detecting interfering sound.

17. The method of claim 14, wherein the hearing device is a hearing aid configured for wear at or behind an ear of a user of the hearing aid, and wherein the method is performed by the hearing aid.

18. The method of claim 14, further comprising determining if a third focus criterion is satisfied, the third focus criterion being different from the first focus criterion and the second criterion.

19. The method of claim 14, wherein the act of applying the first beamforming mode comprises increasing a directionality of a current beamforming.

20. The method of claim 14, further comprising applying a second beamforming mode if the movement parameter MP does not satisfy the movement criterion.

21. The method of claim 20, wherein the act of applying the second beamforming mode comprises applying no beamforming directionality or reducing a directionality of the current beamforming.

* * * * *